June 18, 1929.　　A. EHRLER ET AL　　1,717,919
PROTECTIVE ELECTRICAL CONNECTING DEVICE
Filed Dec. 3, 1925　　3 Sheets-Sheet 1
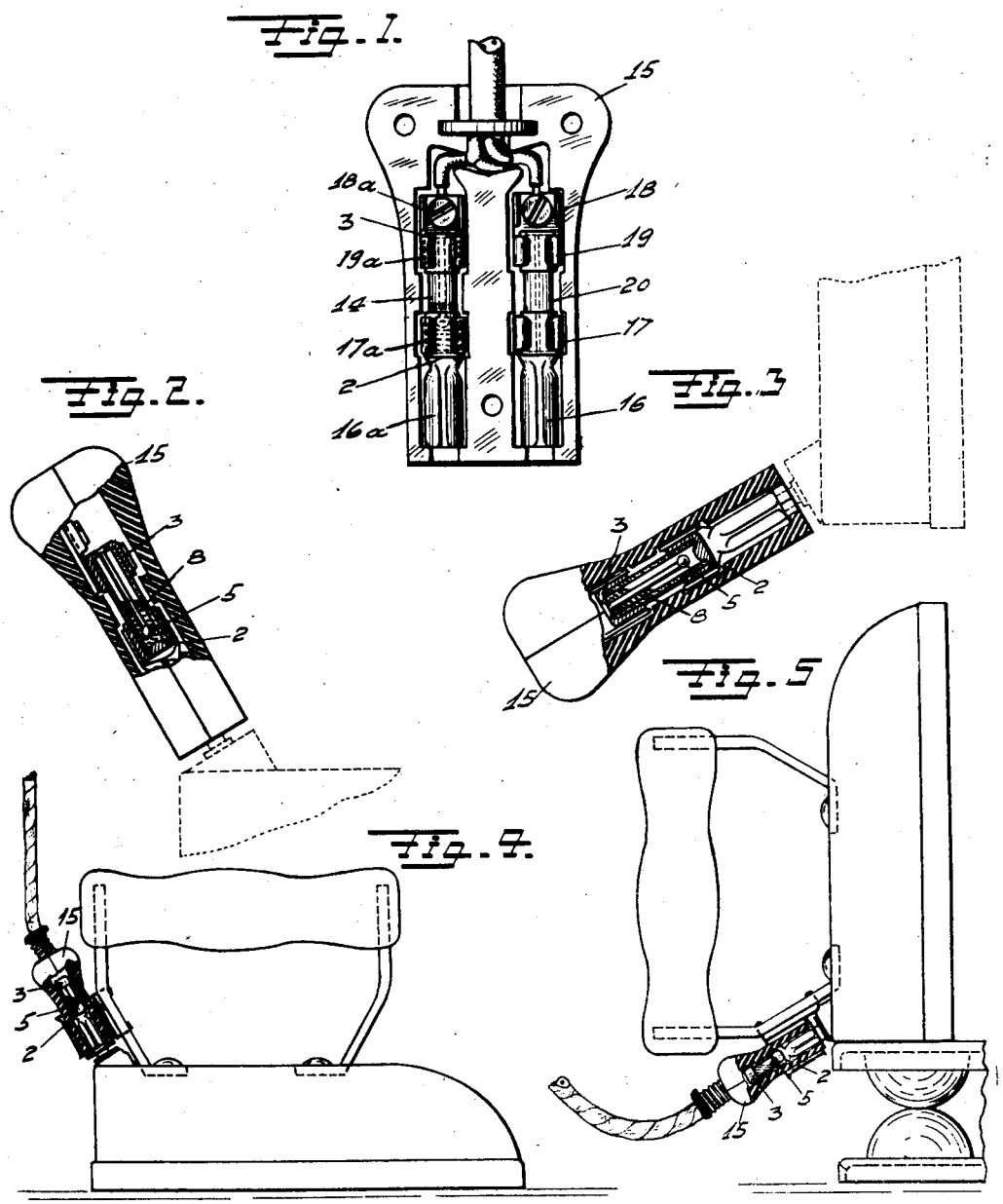
INVENTORS
Albert Ehrler and Ivar Simonsen
BY Joseph Brown
ATTORNEY

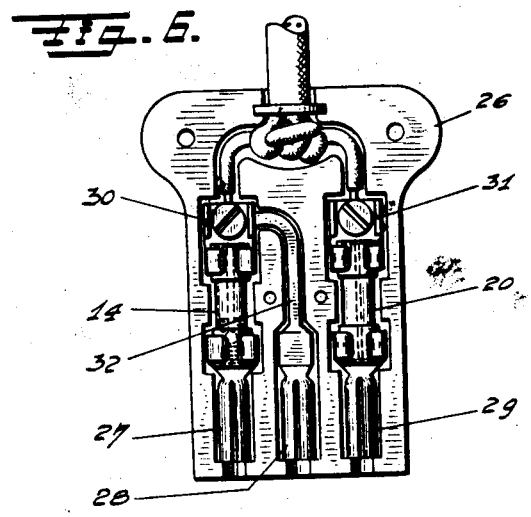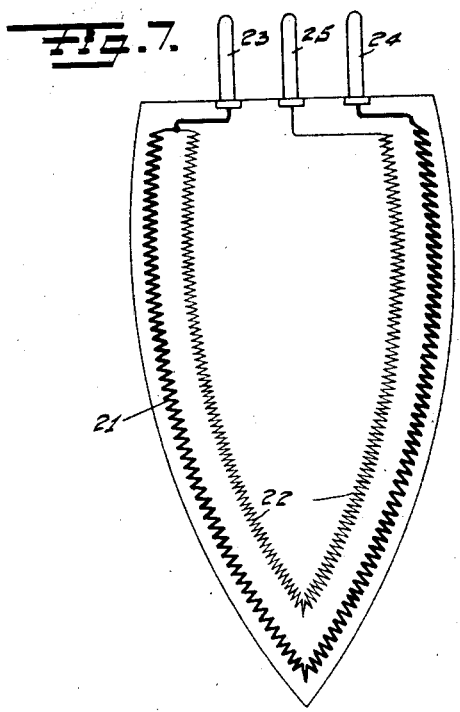

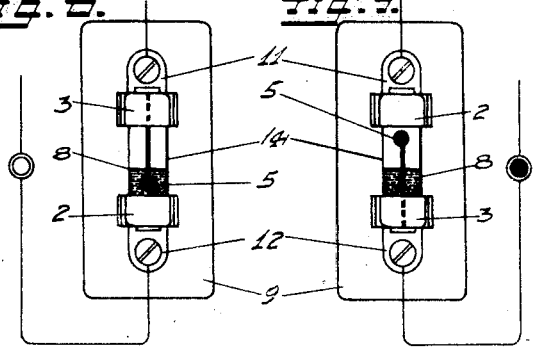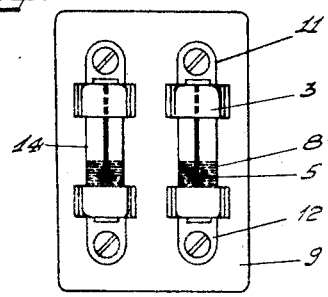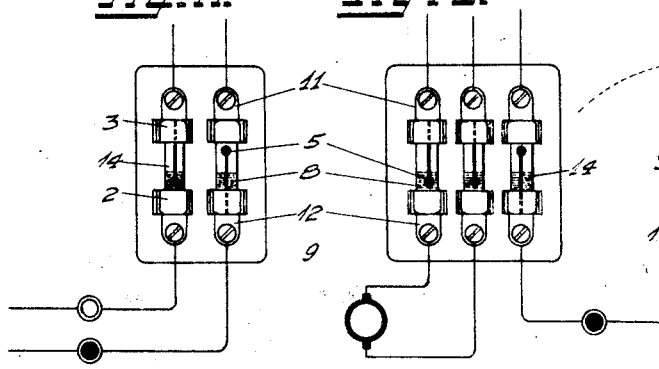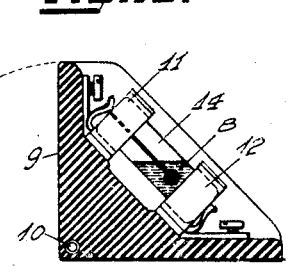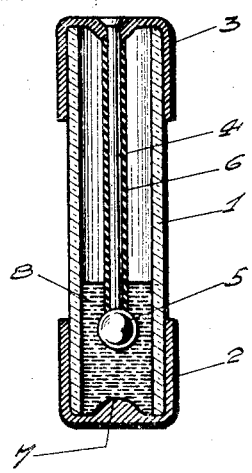

Patented June 18, 1929.

1,717,919

UNITED STATES PATENT OFFICE.

ALBERT EHRLER AND IVAR AMUNDSEN, OF NEW YORK, N. Y.

PROTECTIVE ELECTRICAL CONNECTING DEVICE.

Application filed December 3, 1925. Serial No. 72,938.

Our invention relates to improvements in electric current connecting devices, commonly known as electric connection plugs, and utilized in combination with electrical apparatus for industrial, domestic, dental, therapeutic and other purposes.

The objects of our invention are as follows:

First: to provide an electrical switching device of such design as to eliminate all of the otherwise necessary mechanical and operating contact parts.

Second: to arrange such an electrical switching device in such manner as to be easily attached, detached, or interchanged to or from a suitable electric connection plug.

Third: to also combine such a connection plug with a suitable current protecting device, to eliminate and guard against the dangers of overload currents.

Fourth: to provide suitable encasing means for such a combined electric connection, switching, and protecting device, so arranged as to render the individual parts of the device easily accessible.

Fifth: to arrange these switching and protecting devices and their encasing in such manner as to form a self contained unit serviceable as a means for connecting or disconnecting to and from any suitable electrical apparatus.

Sixth: to arrange the electrical switching device of such a connection plug to permit a reduction of the current consumption of any electrical heating apparatus, if so desired.

Seventh: to produce an electrical connection plug combined with interchangeable electrical switching and current protecting devices of such simple and inexpensive design as to permit large quantity production at the lowest cost.

Our invention will be fully understood from the following description taken in connection with the accompanying drawings in which:

Figure 1, represents a front view of an electrical connection plug embodying the features of our invention, the cover portion of the plug being removed.

Figure 2, represents an enlarged and partly sectional view of such a connection plug and in a position as shown in Figure 4.

Figure 3, represents an enlarged and partly sectional view of such a connection plug and in a position as shown in Figure 5.

Figure 4, represents an electric iron in combination with such an electrical connection plug, the electric iron being shown in the active service position.

Figure 5, represents the same electric iron in the inactive position.

Figure 6, represents a front view of an electrical connection plug with cover removed, and especially arranged to permit the reduction of current consumption in electrical apparatus.

Figure 7, represents a diagrammatical view of the base of an electric iron showing the resistor and heating elements arranged for the connection plug shown in Figure 6.

Figures 8, 9, 10, 11, 12 and 13 represent views of various applications of the electrical switching device.

Figure 14, represents an enlarged view showing the details of construction of the electrical switching device.

Similar characters refer to similar parts throughout the various views.

The electrical switching device whose various applications are indicated in Figures 8 to 13, and the details of which are more clearly shown in Figure 14, is composed of a tubular member 1, made of suitable insulating material as for instance, glass, fibre, or bakelite etc., a metallic cap 2, cemented or otherwise suitably fastened to one end of member 1, and another metallic cap 3, similarly fastened to the other end of member 1. An electrode comprising a stem 4, and a ball-shaped terminal 5, is permanently fastened and in perfect electrical contact with cap 3.

A protective covering 6, of insulating material, is provided around stem 4. The ball shaped terminal 5, is preferably located in close proximity to a centrally located raised portion 7, of cap 2.

The intervening space between electrode 5 and portion 7, is filled with an electric current conducting liquid 8, which may be mercury or a similar substance. In the position as indicated in Figure 14, cap 2 and terminal 5 are electrically connected by liquid 8. Now if the device is tilted or turned around so that cap 3 will be positioned at the bottom, liquid 8 must flow into cap 3, thereby interrupting the electrical connection between terminal 5 and cap 2.

The individual switching device as shown in Figure 14, permits of a great number of applications some of which are illustrated in Figures 8 to 13. Figure 13 is a typical sectional side elevation of applications shown in Figures 8 to 12. A rocking block 9, pivoted at 10, carries the clip terminals 11 and 12, receiving the switching device 14. Rocking block 9 may be swung into either position, causing the electric current carrying liquid to flow into one or the other terminal cap of the switching device 14.

In Figures 8 and 9 a plain single pole circuit interrupting switch is shown with the ball shaped terminal 5, in the up and down position.

In Figures 10 and 11, a two pole arrangement similar to Figures 8 and 9 is shown, while Figure 12 represents a triple pole switch arrangement, useful for motor and indicating purposes.

In Figure 1, an electrical connection plug embodying a switching device and a current protecting device is illustrated. Embedded in suitably shaped depressions of a plug 15, terminal-sleeves 16 and 16ª carrying contact clips 17 and 17ª, and connection terminals 18 and 18ª carrying contact clips 19 and 19ª, are located. Contact clips 17ª and 19ª, receive and hold the electrical contact caps 2 and 3, of switching device 14, while contact clips 17 and 19 receive the current protecting device 20, commonly known as a fuse.

In Figures 4 and 5, one of the many possible practical applications of such an electrical connection plug is illustrated. For this purpose an electric iron has been selected and is shown in its active service position in Figure 4. In this position contact is made by the current carrying liquid 8 between the terminal 5 and cap 2, while by simply tilting the electric iron into a position as indicated in Figure 5, the current will be automatically interrupted by the electric liquid 8 flowing away from the contacts and into the opposite cap 3.

Figures 2 and 3 represent enlarged views of the connection plug and its positions shown in Figures 4 and 5, for the purpose of more clearly illustrating the functioning of the switching device. The advantages derived by such switching arrangements in combination with electric irons, or in fact with any electric heating device is obvious, it will not only act as a safety device but also prove exceedingly economical by saving a large amount of otherwise wasted current.

In many cases, especially for industrial purposes, it may be desirable not to entirely cut off the electric current but to reduce the same to a fraction of the full amount. This may be accomplished by the arrangement shown in Figures 6 and 7. Figure 7 represents a diagrammatical arrangement of the heating base of an electric iron provided with a low resistance or electric heating unit 21, and a high resistance or protective unit 22. One end of both of these units is connected to a common terminal stud 23, while the other ends are individually connected to terminal studs 24 and 25.

A connection plug 26, provided with three correspondingly arranged terminal sleeves 27, 28 and 29, the center terminal 28 of which is electrically connected to the terminal end of switch clip 30, by means of a connecting strip 32. All other arrangements being identically the same as those shown and explained in connection with Figure 1.

Assuming the iron being in the operating position, the current will flow from a terminal 30, through switch 14, over terminal sleeve 27, to terminal stud 23, into the low resistance unit 21 and return over terminal 24, sleeve 29, fuse 20, to terminal 31. A negligible amount of current will flow over the high resistance unit 22. In this working position the full amount of electric current will pass through unit 21 and consequently the iron will develop its maximum quantity of heat. Assuming the iron being tilted into its out-of-service position (see Fig. 5), the current will now pass from terminal 30 over connector 32 to sleeve 28, terminal stud 25, high resistance unit 22, into low resistance unit 21, terminal stud 24, sleeve 29, fuse 20, and back to terminal 31. In this case, the high resistance unit being connected in series with the low resistance unit, only a small percentage of the normal current will pass into unit 21, and consequently a proportioinally small amount of heat will be developed, which as a rule is just enough to keep the iron sufficiently warm to insure a quick heating up, in case full heat is again required.

Should for any reason an excessive amount of current pass into the electric iron, fuse 20 will melt and interrupt the electric circuit completely from the source, thus adding another precautionary safety feature guarding against any unforeseen accidents.

Having thus fully described and illustrated our invention we do not wish to be limited to the exact construction or applications shown, it being apparent that there may be considerable variations in utilizing the principles disclosed without departing from the spirit of our invention.

What we claim and desire to secure by Letters Patent is:

1. In an electric connecting device the combination of detachably arranged and automatically operated electric current interrupting means, and detachably arranged electrical current protecting means, and both said detachable electric current interrupting means and said detachable current protecting means incorporated and forming one unit with said electric connecting device.

2. In an electrical connection plug the combination of a plurality of suitably arranged electrical connecting members, a suitable interchangeably arranged and automatically actuated electric liquid current closing and interrupting device, and a suitable interchangeably arranged electric current protecting device, and suitably arranged electrical contact members for the purpose of electrically interconnecting said interchangeable current closing and interrupting device and said interchangeable current protecting device with said plurality of electrical connecting members.

3. In combination, an electrical connecting plug of the character described comprising a detachably arranged protective fuse member, a detachably arranged electric liquid-type switching member, and said electric liquid-type switching member adapted to automatically close an electric circuit when said connecting plug is in the operative position and automatically interrupt said electric circuit when said connecting plug is in the inoperative position, substantially as and for the purpose set forth.

4. In a detachable electrical circuit connecting device, adaptable for electric heating apparatus designed for high and low heat (two heat) service, the combination of a common enclosure, suitable depressions provided within said enclosure for the purpose of receiving a plurality of flexible metallic electrical connecting members, one of said electrical connecting members adapted to receive an electrical liquid switching device, another flexible metallic electrical connecting member suitably electrically connected to aforementioned connecting member and thus forming an electrical branch connection from said liquid switching device all incorporated into one leg of the electric circuit, and a similarly arranged flexible metallic electrical connecting member connected to the other leg of the electric circuit, said connecting member adapted to receive an electric current overload protecting device, and all of the members suitably arranged and electrically interconnected to permit the said electrical heating apparatus to operate at high heat when in the operative position and to automatically operate at low heat when in the inoperative position, substantially as and for the purpose set forth.

5. In an electrical circuit connector, adaptable for electrical heating devices designed for high and low heat service, the combination of a suitable casing, suitable detentures provided within said casing for the purpose of positioning a plurality of removably arranged flexible metallic electrical connecting members, one of said connecting members provided with suitable contact means to receive and interchangeably hold an electrical liquid switching device, another flexible metallic connecting member so electrically interconnected as to form a branch circuit from said interchangeable liquid switching device in one leg of the circuit of said heating devices, and a similarly arranged flexible metallic connecting member provided with suitable contact means to receive and interchangeably hold an electrical current over-load protecting device in the other leg of the circuit, and all of the electrical members so arranged and inter-connected to permit said electrical heating devices to operate at high heat when in the operative position, and to automatically operate at the low heat when in the inoperate position, substantially as and for the purpose set forth.

Signed at New York, in the county of New York and State of New York, this 27th day of November, A. D. 1925.

ALBERT EHRLER.
I. AMUNDSEN.